HILDRETH & JOHNSON.
Wire Broiler.
No. 47,302.  Patented April 18, 1865.
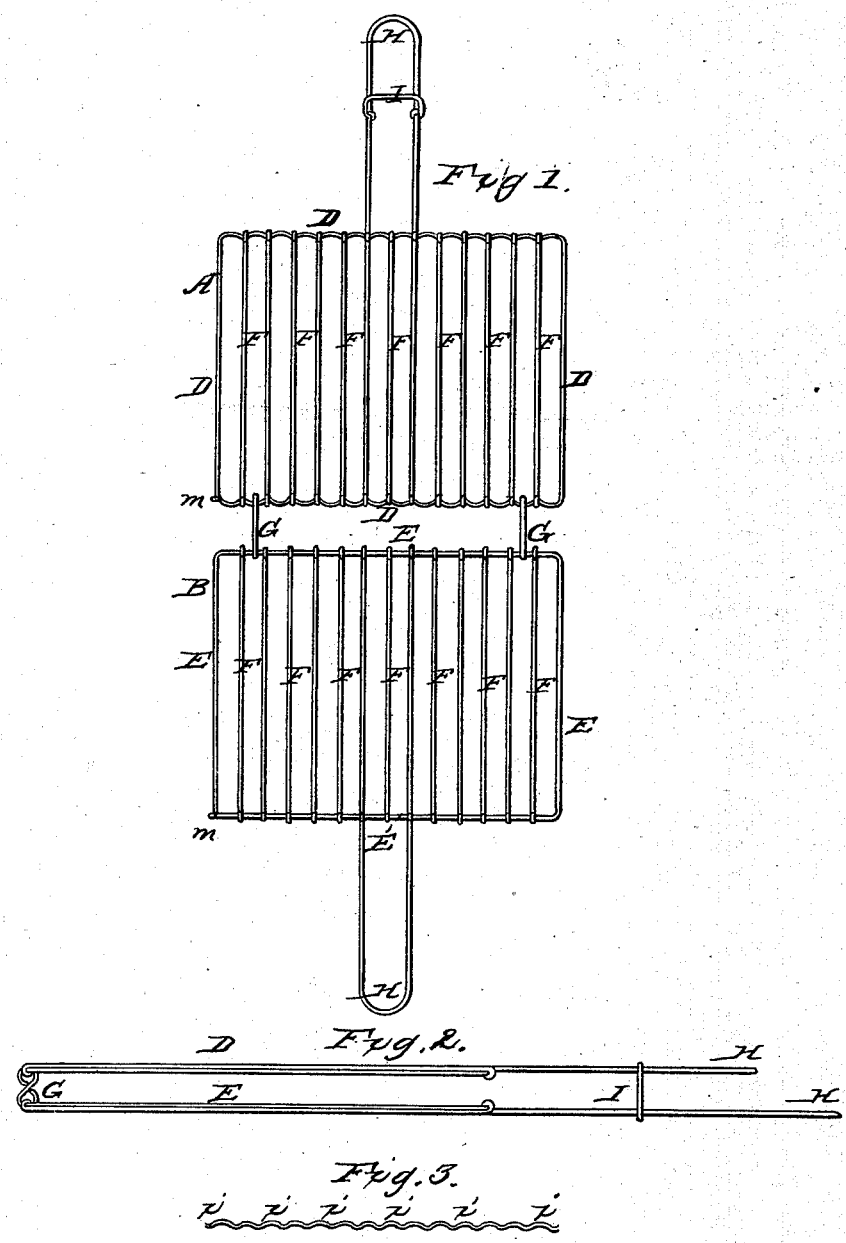

UNITED STATES PATENT OFFICE.

H. A. HILDRETH, OF LOWELL, AND W. J. JOHNSON, OF NEWTON, MASS.

WIRE BROILER OR TOASTER.

Specification forming part of Letters Patent No. 47,302, dated April 18, 1865.

*To all whom it may concern:*

Be it known that we, H. A. HILDRETH, of Lowell, and W. J. JOHNSON, of Newton, in the county of Middlesex and State of Massachusetts, have invented a new and useful Improvement in Wire Broilers and Toasters; and we do hereby declare that the following is a full, clear, and exact description of the construction and operation of the same, reference being had to the accompanying drawings, forming a part of this specification, in which—

Figure 1 is a plan representing the two parts or wings of the utensil thrown open; Fig. 2, a side view of the same folded, as when holding a piece of meat or bread. Fig. 3 is a separate view of a piece of crimped wire.

Like parts are indicated by the same letters in all the drawings.

The nature of our invention consists in crimping the wire of which the ends of the frame are made, so as to form beds or recesses for the reception of the bars or slats, whereby the latter are securely held in place, and a simpler, cheaper, neater, stronger, and more durable article is produced than any of its kind known or used before.

To enable others skilled in the art to make and use our invention, we will now proceed to describe the construction and operation of the same.

The implement consists of two slatted frames or wings, A and B, united by means of wire hinges G G, which may be bent into the form of S's or rings of the required length or diameter, as shown in Figs. 1 and 2. The frame of each half or wing consists of a single piece of iron wire of the requisite stiffness and bent by any suitable means into the form represented in Fig. 1, the two ends of the wire meeting at the corner *m*, where the one is clasped around the other. That portion of the wire forming the two opposite ends of each frame is crimped, as shown in Fig. 3.

The bars F (as shown in the wing A of Fig. 1) are clasped around the frame in the crimped recesses *i*, (see Fig. 3,) whereby the said bars will be securely held in place and prevented from sliding laterally.

H H are the two handles, shaped as represented in Fig. 1, being simply continuations of the two central bars, the two extremities of the wire forming these handles being clasped around one end of the frame in the same manner as the other bars, and confined to the opposite end of the frame by means of smaller wires passed around them, or in any other obvious manner.

I is a sliding wire clamp which connects the two handles H H in the position represented in Fig. 2, whereby the meat or bread to be broiled or toasted is securely confined between the two wings A and B, so that when one side is sufficiently done it may be instantly turned and the opposite side presented to the fire.

Our method of constructing broilers and toasters of wire not only produces a simpler, cheaper, neater, stronger, and more durable article, but one which can be more readily cleaned and kept from rusting than any other of its kind in use.

Having thus described the nature of our invention, what we claim as new, and desire to secure by Letters Patent, is—

As an improvement in the construction of wire broilers and toasters, the crimping of the ends of the frames for the reception of the bars or slats, substantially as and for the purpose described.

H. A. HILDRETH.
W. J. JOHNSON.

Witnesses:
N. AMES,
GEO. R. CLARKE.